United States Patent [19]

Fuisz et al.

[11] Patent Number: 5,427,811
[45] Date of Patent: Jun. 27, 1995

[54] METHOD AND APPARATUS FOR SPINNING THERMO-FLOW MATERIALS

[75] Inventors: Richard C. Fuisz, Great Falls; B. Arlie Bogue, Broad Run; Kerry Nansel, Arlington, all of Va.

[73] Assignee: Fuisz Technologies Ltd., Chantilly, Va.

[21] Appl. No.: 192,133

[22] Filed: Feb. 4, 1994

Related U.S. Application Data

[63] Continuation-in-part of Ser. No. 954,257, Sep. 30, 1992, abandoned.

[51] Int. Cl.6 .......................... A23G 7/00; A23P 1/00
[52] U.S. Cl. ......................... 426/465; 99/483; 219/386; 264/8; 366/146; 425/9; 426/517; 426/658
[58] Field of Search ............... 426/465, 517, 519, 658; 425/9; 264/8; 99/348, 483, 451; 366/146; 219/386, 429

[56] References Cited

U.S. PATENT DOCUMENTS

| | | | |
|---|---|---|---|
| 816,055 | 3/1906 | Zoeller | 425/9 |
| 1,541,378 | 6/1925 | Parcell | 425/9 |
| 3,070,045 | 4/1961 | Bowe | 425/9 |
| 3,073,262 | 8/1961 | Bowe | 425/9 |
| 3,118,396 | 1/1964 | Brown et al. | 425/9 |
| 3,856,443 | 12/1974 | Salvi | 425/9 |
| 3,930,043 | 12/1975 | Warning et al. | 426/660 |
| 4,793,782 | 12/1988 | Sullivan | 425/9 |
| 4,842,502 | 6/1989 | Tsumita et al. | 425/9 |
| 4,855,326 | 8/1989 | Fuisz | 424/439 |
| 4,872,821 | 10/1989 | Weiss | 425/9 |
| 4,873,085 | 10/1989 | Fuisz | 426/660 |
| 4,997,856 | 3/1991 | Fuisz | 426/660 |
| 5,011,532 | 4/1991 | Fuisz | 426/660 |
| 5,028,632 | 7/1991 | Fuisz | 426/658 |
| 5,034,421 | 7/1991 | Fuisz | 426/658 |
| 5,096,492 | 3/1992 | Fuisz | 426/658 |

FOREIGN PATENT DOCUMENTS

| | | | |
|---|---|---|---|
| 2413396 | 2/1975 | Germany . | |
| 266552 | 7/1970 | U.S.S.R. | 425/9 |

Primary Examiner—George Yeung
Attorney, Agent, or Firm—Hoffman & Baron

[57] ABSTRACT

A method and apparatus for spinning materials, such as saccharides and non-saccharides, is provided. The apparatus includes a spinner head which is rotatable about an axis. The spinner head includes a heating element which defines a narrow, elongate opening extending about the axis of rotation. The heating element defines an annular wall of the chamber against which material is propelled when the spinner head is rotated. The opening provides a substantially non-tortuous path in which the material is subjected to flash flow and then projected from the chamber into a basin. A helical heating cable may be used as the heating element and to provide a substantially continuous spiral opening of uniform height. The gaps between turns of the heating coil may be determined by comb-like elements which engage and maintain the turns in selected positions.

31 Claims, 8 Drawing Sheets

METHOD AND APPARATUS FOR SPINNING THERMO-FLOW MATERIALS

This is a continuation-in-part of application Ser. No. 07/954,257 filed on Sep. 30, 1991, now abandoned.

BACKGROUND OF THE INVENTION

1. Field of the Invention

The field of the invention relates to a method and apparatus for heating and spinning thermo-flow materials such as corn syrup solids, sucrose, polymeric materials and the like.

2. Brief Description of the Prior Art

Various spinning machines have been designed for spinning molten materials, particularly sugar. The materials may be introduced to the spinning assembly in molten form or, alternatively, introduced in solid form and melted or subjected to flash flow just prior to being spun out from the spinning assembly.

U.S. Pat. No. 4,872,821 discloses a spinning machine which is particularly designed for spinning cotton candy. The machine includes a spinner head having slotted, cylindrical walls and heating elements adjacent to each wall. Sugar in solid form is introduced into the spinner head and propelled against the heating elements where it is melted (i.e., undergoes flash flow transition) and caused to travel through a tortuous path. The molten sugar is spun out through the slots where it solidifies into the floss-like material known as cotton candy.

Various other machines have been designed over the years for spinning cotton candy. One such machine is disclosed in U.S. Pat. No. 3,930,043. This machine includes a helical resistance heating element positioned within a finely perforated shell. The heating element is supported against the inner wall of the shell by spacer elements. As the shell spins, molten sugar is extruded through the perforations. Similar machines are disclosed in U.S. Pat. Nos. 3,073,262 and 3,070,045.

U.S. Pat. No. 3,856,443 discloses another type of spinning machine wherein the perforated shell through which sugar is extruded functions as the resistance element of the heating means.

U.S. Pat. No. 1,541,378 discloses a spinning machine including a heating ribbon positioned within a helically wound wire. The heating ribbon melts the sugar, which then passes through the interstices thereof and then between the coils of the helically wound wire.

Finally, U.S. Pat. No. 816,055 discloses a spinning machine including a pair of heating elements positioned on opposite sides of a perforated shell. The outer element is maintained at a low heat setting.

The art relating to spinning machines is generally directed to machines for making cotton candy. Sugar is introduced into a spinner head, and is ordinarily caused to travel through a rather tortuous path where it is converted to a molten state. The molten material is spun out of the head, and solidifies into a floss-like material. The material is then collected in a basin or basket surrounding the spinner head.

While much of the existing machinery probably performs satisfactorily for converting granular sugar into a floss-like material, it is not entirely satisfactory for spinning other materials which may have properties quite dissimilar to sugar, or which tend to be more adversely affected by heat than sugar. In recent years, it has been increasingly desirable to spin not only sugar and materials combined with sugar, but also non-saccharides.

One recently developed method of producing substances having pharmacological properties is disclosed in U.S. Pat. No. 4,855,326. This patent discloses combining sugar with a medicament and spinning the combination into a readily water-soluble floss or fiber. In U.S. Pat. No. 5,011,532, the disclosure concerns oleaginous substances such as vegetable oil, baby oil, margarine, lanolin, cocoa butter and the like, and how their lack of affinity for water is altered by mixing the oleaginous substance with sugar and melt-spinning the mixture in cotton candy spinning machines or the equivalent. As so modified, the products disperse in water forming a colloidal or pseudocolloidal dispersion.

Other disclosures which relate to spinning substances with one or more sugars are found in U.S. Pat. No. 4,873,085 issued Oct. 10, 1989, U.S. Pat. No. 5,034,421 issued Jul. 23, 1991, U.S. Pat. No. 5,028,632 issued Jul. 2, 1991, and U.S. Pat. No. 4,997,856 issued Mar. 5, 1991. The products described in the above-mentioned patents and applications are all produced by processing in a cotton candy machine. Illustrative of a cotton candy machine is the Econo Floss Model 3017 manufactured by Gold Medal Products Co. of Cincinnati, Ohio. The process described in the above-identified disclosures involve the use of sugar(s) as a feedstock material which is spun to produce a material such as a floss, fiber, etc.

The use of non-saccharide polymers as biodegradable carriers for various active agents has recently been proposed. Such carriers are spun with the active agents to produce a solid capable of releasing the active agent over time within the body of a patient.

Conventional machinery may be unacceptable for spinning certain materials for a number of reasons other than the possible adverse effects of heat. If conductive materials are introduced into a spinning machine, an electrical short could occur between heating elements or a heating element and other metal parts of the machine such as the metal band which surrounds many conventional heating elements. Another possible drawback of conventional spinning machinery is that the morphology of the resulting product may not be the most desirable for its intended use. Conventional machinery also may not offer the user a choice in the size of the openings through which molten materials are caused to pass prior to being spun out from the spinner head. A need clearly exists for spinning machinery which provides the user with the ability to melt and spin many different types of materials without adversely affecting the properties thereof, produces materials of desired morphology, and offers adjustability in the dimensions of the openings through which materials are ejected from the spinner head.

SUMMARY OF THE INVENTION

It is an object of the invention to provide a spinning machine which is capable of melting solid materials or subjecting them to flash flow within a spinner head and projecting them into a collector.

It is another object of the invention to provide a spinning machine capable of handling a wide variety of materials, including conductive and non-conductive materials.

A still further object of the invention is to provide a spinner head including a heating element which defines the opening(s) through which material is expelled from the spinner head, and which allows adjustment of the size of such openings.

A still further object of the invention is to provide a spinning machine which minimizes the time in which material is in proximity to the heating element of the spinner head before being expelled.

A further object is to provide a spinner head which has no obstructions or tortuous path for the material being processed in order to shorten the residence time of the heated material.

A still further object of the invention is to provide a method and apparatus for subjecting thermo-flow material to a flash flow process, causing the material to be resolidified without adversely affecting the material, and/or shaping the material into a desired configuration.

In accordance with these and other objects of the invention, a spinning machine is provided which includes a spinner head and means for rotating the spinner head about an axis. The spinner head includes a heating element including at least one narrow, elongate opening which extends at least partially about the axis of rotation of the spinner head. The opening is preferably between about 0.005 to 0.050 inches in height, and defines a substantially non-tortuous path through which material within the spinner head may pass. Means for adjusting the height of the opening may be provided. The heater element is preferably in the form of a helically wound cable which extends about the axis of rotation of the spinner head. The heating element accordingly defines a substantially continuous, helical opening or series of openings through which material can be heated and then expelled. Substantially uniform spacing is preferably maintained between each turn of the helically wound cable.

A method of transforming the physical structure of a material is also provided by the invention. The method includes the steps of providing a spinner head which is rotatable about an axis of rotation and includes a heating element, the heating element defining an elongate, narrow opening extending at least partially about the axis of rotation, introducing material into the spinner head, rotating the spinner head about the axis such that the material is propelled against the heating element, transformed to a flowable state, shaped by the opening defined by the heating element, and expelled through the opening as fine, discrete bodies. In accordance with one embodiment of the invention, the bodies expelled by the spinner head are in the form of sheet-like flakes rather than the floss or filaments expelled in most prior art spinning machines.

DETAILED DESCRIPTION OF THE INVENTION

Figure 1:
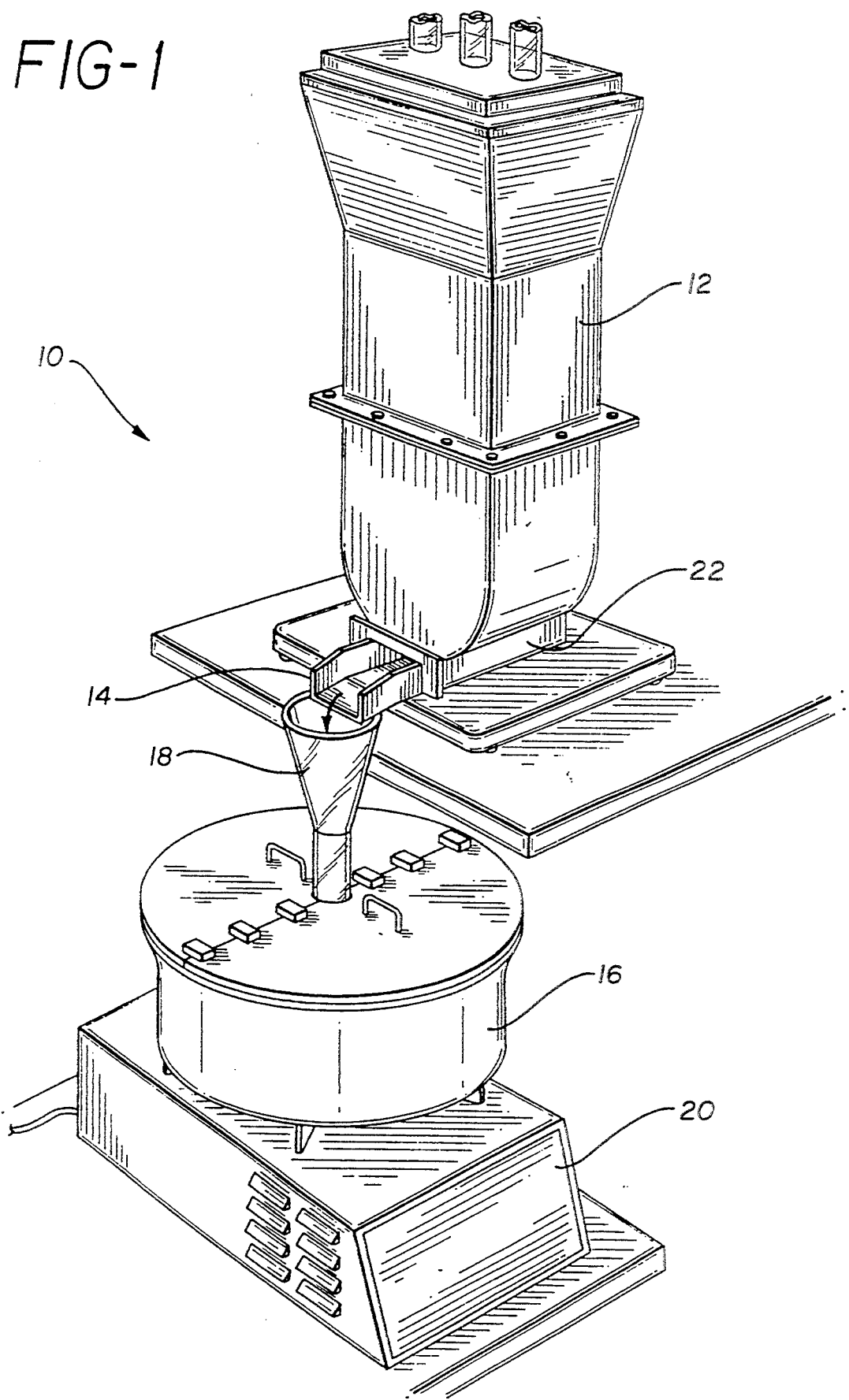
FIG. 1 is a perspective view of an assembly for feeding, spinning and collecting materials such as thermo-flow materials.

A method and apparatus is provided for subjecting materials to a flash flow process and subjecting them to centrifugal forces by a spinner head.

"Flash flow" is referred to in the present application as a phenomenon which occurs when a solid carrier material (e.g., thermoplastic material) is subjected to conditions of temperature and shear sufficient to provide internal flow at a subparticle level. This condition produces a transformation of physical and/or chemical structure without degradation of the material. Internal flow occurs when the infrastructure of the material breaks down sufficiently to permit movement of the material at a subparticle level, and probably at a molecular level. At a molecular level, internal flow contemplates the movement of molecules relative to each other.

"Thermo-flow" as used herein refers to solid materials which flow when heated, i.e., they undergo intraparticle flow when heated prior to undergoing substantial degradation or decomposition. Thermo-flow as used herein includes thermoplastic polymers as well as materials such as sugars, saccharides, polysaccharides, etc., which exhibit intraparticle flow when heated. Examples of such materials are sugars as disclosed in U.S. Pat. No. 4,855,326 issued Aug. 8, 1989, polydextroses as disclosed in U.S. application Ser. No. 881,603 filed May 12, 1992, maltodextrins (including corn syrup solids) as disclosed in U.S. application Ser. No. 847,595 filed Mar. 5, 1992, and thermoplastic polymers such as disclosed in U.S. application Ser. No. PCT/US92/04053 filed May 13, 1992, and biodegradable polymers as disclosed in U.S. application Ser. No. 893,238 filed Jun. 3, 1992, all of which are incorporated herein by reference.

In the present invention, thermo-flow material is subjected to flash flow sufficiently to deform and pass through an opening under a minimum amount of force. The force used in the present preferred embodiments of the invention is centrifugal force provided by a spinner head from which the deformed flowable material is thrown at high speed. No external force is imposed on the flowable material after it is flung out of the spinning head other than resistance provided by ambient air. The thermo-flow material instantaneously reforms as a solid having altered physical and/or chemical structure. The altered structure results from the forces acting on the material as it exits the head and is hurled outwardly during the brief period during which it experiences flash flow.

The flash flow phenomenon of the present invention occurs in not more than one second, preferably on the order of tenths of seconds, e.g., not more than about 0.4 seconds, and most preferably on the order of milliseconds and most preferably not more than 0.1 seconds. This unique phenomenon can be produced by relatively high speed distribution of the thermo-flow material to an environment of elevated temperature under a constant force, such as centrifugal force, caused by high speed rotation of a spinner head. The spinner heads according to the invention are design to minimize the dwell time of the material during which it undergoes the flash flow transition. The important aspect is that the flash flow phenomena be induced in a solid feedstock for rapid transition to solid material having an altered structure from that of the feedstock, but without degradation of the material.

Referring now to the drawings, FIG. 1 shows an assembly 10 for feeding materials to a spinner head where they may be subjected to a flash flow process and collected in a basin or basket. The assembly includes a hopper 12, a chute 14, a basin 16, a spinner head (not shown) positioned within the basin 16, a funnel 18 for directing material from the chute 14 to the spinner head, and a base 20. The base includes a motor (not shown) for driving the spinner head in a known manner as described in U.S. Pat. No. 4,872,821, which is incorporated by reference herein, which has been converted to a variable speed drive system. A feeder assembly 22 is positioned at the base of the hopper, the chute 14 extending therefrom. The feeder assembly may include a screw-type feeder or the like for moving material from the hopper to the funnel 18.

Figure 2:
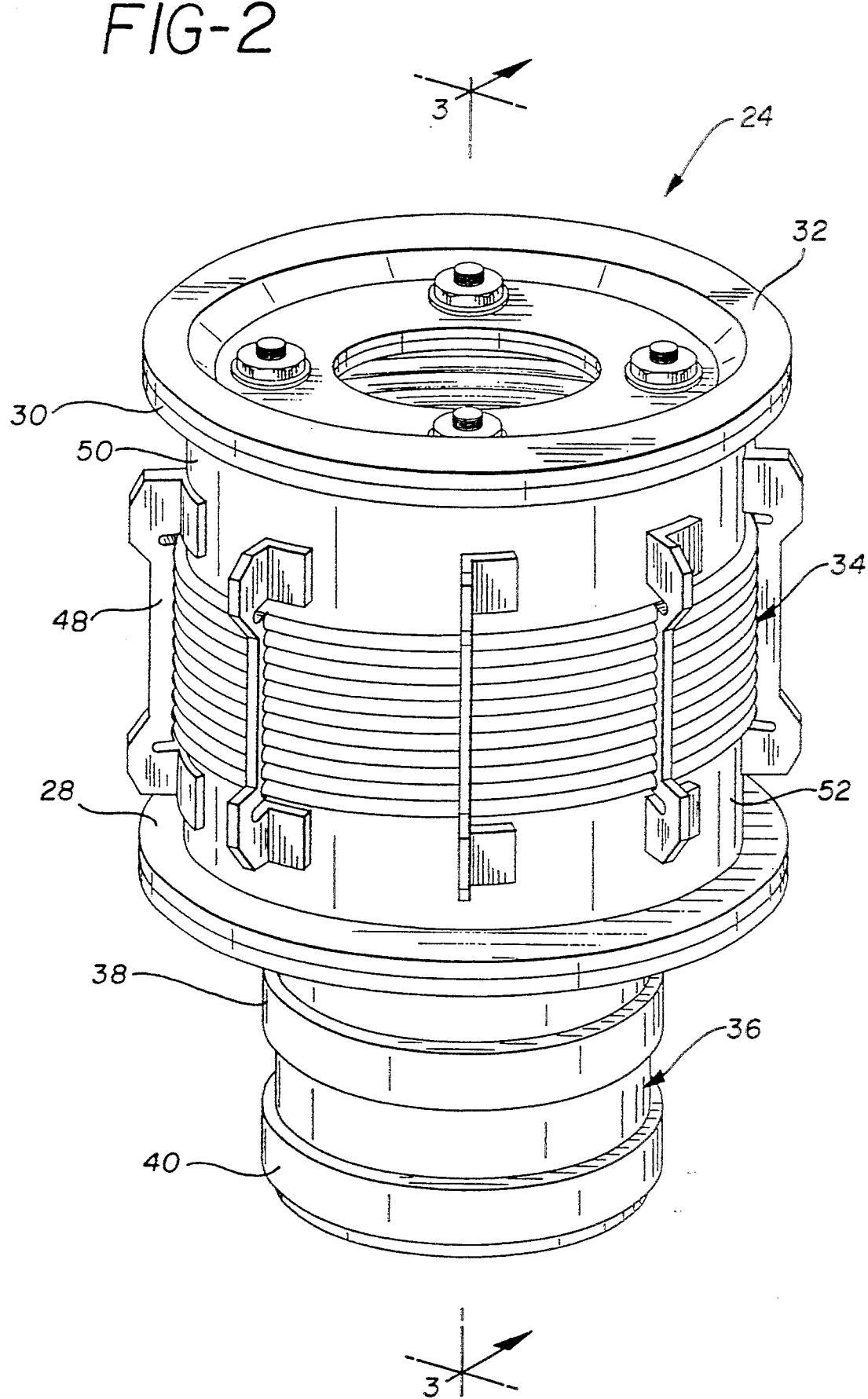
FIG. 2 is a top perspective view of a spinner head in accordance with a first embodiment of the invention.
Figure 3:
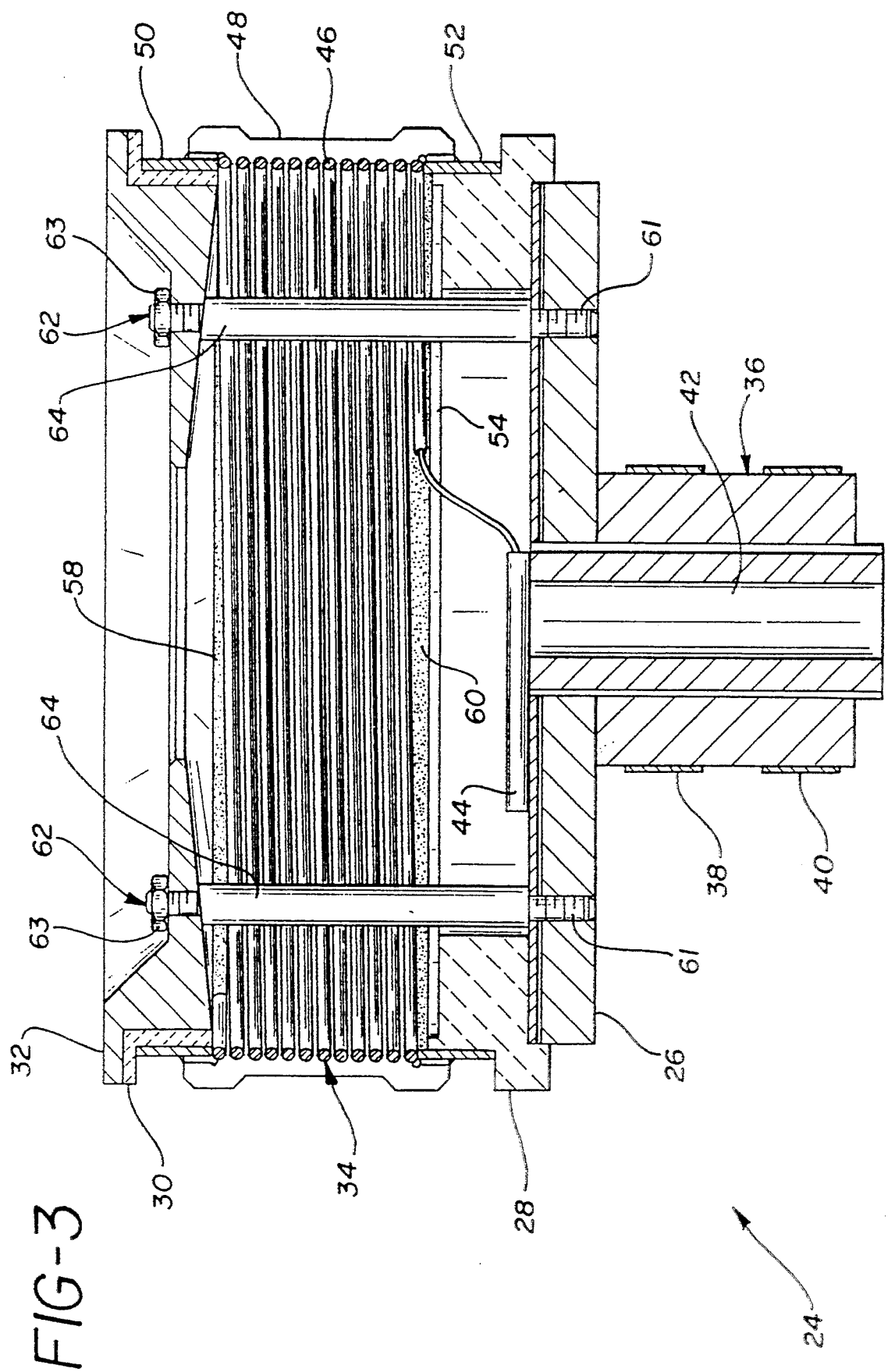
FIG. 3 is a sectional view thereof taken along line 3—3 of FIG. 2.

FIGS. 2-3 show a spinner head 24 according to a first embodiment of the invention. The spinner head includes a base member 26, a bottom insulating ring 28, a top insulating ring 30, an aluminum cap 32, and a heating element 34. The base and cap may be made from stainless steel or other suitable material, while the insulating rings are preferably made from a ceramic material or a heat resistant polymer. The cap includes an opening aligned with the funnel 18. A stem 36 extends from the base. The stem includes slip rings 38, 40 which are engaged by brushes (not shown), and an upright shaft 42 which is driven by the motor within the base 20. The stem is similar to that disclosed in U.S. Pat. No. 4,872,821, and functions in a similar manner. An electronic interface assembly 44 is mounted to the base member 26, and powers the heating element 34.

The heating element 34 is comprised of a cable 46 which is wound helically about the axis of rotation of the spinner head. While the cable forms a single helix as shown in the drawing, it may alternatively be wound as a double helix. Cable heaters are well known commodities, and are used in a number of applications, including some of the cotton candy machines discussed above. A suitable cable includes a nichrome wire, an outside sheath made from a corrosion-resistant alloy such as a nickel-chromium alloy sold under the trademark Inconel, and a magnesium oxide insulator. Whereas prior art spinner heads have included cable heaters for the purpose of heating perforated walls and the like, they have not been used to define the openings through which material is projected after undergoing a flash flow transition. As described below, the cable heater used in accordance with the present invention is constructed to not only heat the material in the spinner head, but also to contribute to the ultimate morphology or shape of the material projected by the spinner head into the basin. Together with the bottom portion of the spinner head, it defines a substantially cylindrical chamber for receiving material from the feeder 22.

In order to function in the desired manner according to the invention, the cable 46 is wound such that the distance between turns of the heating element is small enough to both heat and shape the material hurled against it as the spinner head rotates. The preferred spacing between turns is about 0.005 to 0.050 inches for most spinning operations. In the case of sucrose, the spacing between turns should be between 0.005 and 0.010 inches. It is important for the spacing between coils to be not only small, but also uniform for most spinning operations. Uniform spacing is required for producing a product having uniform physical characteristics. This is achieved in the first embodiment of the invention through the use of comb-like spacing elements 48, each of which includes a plurality of arcuate notches therein. The diameter of the notches is about the same as the diameter of the cable 46. Each notch is spaced apart by a selected uniform distance, preferably 0.005 to 0.050 inches. The spacing elements 48 are made from 18 gauge stainless steel or other suitable material. They may be spot welded to upper and lower cylindrical shells 50, 52 which define outer surface portions of the spinner head. The cable is brazed to the spacing elements. The cable accordingly forms a substantially perfect spiral which defines the cylindrical wall enclosing the spinner head chamber. An interface shield 54 defines the lower wall of the chamber while the cap defines the upper wall thereof. A plurality of narrow, elongate openings are defined by the cable and spacing elements. These openings together form a substantially continuous, narrow helical opening which extends about the axis of rotation of the spinner head. The spacing elements 48 do not adversely affect the flash flow process or materially impede the projection of product from the chamber.

The insulating ring 30 is positioned between the upper shell 50 and the cap 32. The ring may be made from a phenolic material or other suitable material providing heat and electrical insulation. A layer 58 of epoxy is provided between the cap 32 and the upper turn of the heating element 34. A second layer 60 of epoxy seals the opening between the bottom turn of the heating element and the interface shield 54. The epoxy seals insure that the only opening through which material may exit the spinner head is the helical opening between turns of the heating element. While epoxy has been used to make the seals, other materials such as brazing materials can also be used. As the gap between the turns is uniform, a uniform product is obtained. A thermocouple or some similar heat sensing advice (not shown) may be incorporated within the cable so that temperature can be monitored. Four adjustable spacer assemblies 62, each including a ceramic sleeve 64, hold the parts comprising the spinner head together. The assemblies include a nut fastener 63 at the top of the cap 50 and a mating threaded portion in base 26 for cooperative attachment of a threaded stem 61. They do not materially impede the projection of product towards the cable heating element 34.

In operation, a thermo-flow material or combination of materials is introduced into the hopper 12. The feeder 22 conveys these materials into the spinner head 24. The spinner head is caused to rotate at a selected speed about the axis of the shaft 42, causing the materials to be propelled directly against the substantially cylindrical wall defined by the heating element. The materials are subjected to sufficient heat to allow them to undergo flash flow as they pass through the narrow, elongate, substantially continuous opening. As the flow path between turns of the heating element is both short and straight, the time the materials remain in contact with the cable is minimal. This reduces the chance of causing degradation of materials passing through the heating element. The materials are projected from the opening directly into the basin 16 due to the considerable centrifugal force generated upon rotation of the spinner head and the substantial absence of impediments on either side of the heating element 34. The morphology of the finished product, which reforms as a solid upon exiting the spinner head, depends upon the speed at which the spinner head is rotated, the temperature maintained by the heating element, the distance between turns of the cable, and the materials introduced to the spinner head. The spinning of corn syrup solids, for example, results in the generation of sheet-like flakes. Higher temperatures cause smaller flakes to be produced than lower temperatures. Higher revolutions per minute of the spinner head also produces smaller flakes. When sucrose is processed by the apparatus, bundles of strands or filaments are formed. In contrast to systems where a coil heater is used to heat a perforated wall or the like, substantially all of the material processed undergoes flash flow as it engages and passes through the narrow, elongate series of openings defined by the helical cable. Unlike systems having ribbon type heating elements, the path travelled by the thermo-flow materials is substantially non-tortuous. The morphology of the resulting product is likely to be significantly different using the system according to the invention than either of the known systems discussed above.

EXAMPLES

A spinning machine having a spinner head as shown in FIGS. 2–3 having a 7″ diameter and a 0.020 inch spacing between turns of the heating element was used to process various materials as follows:

| | Material | Heating Element Temp. | Spinner Head Speed | Product Type |
|---|---|---|---|---|
| 1. | Maltodextrin (DE 36) 75% Canola Oil 25% | 150° C. | 3600 RPM | Flakes |
| 2. | Maltodextrin (DE 20-23) | 190° C. | 3600 RPM | Wafers |
| 3. | Maltodextrin (DE 10) | 200–230° C. | 3600 RPM | Wafers & Needles |
| 4. | Polydextrose | 126° C. | 3600 RPM | Flakes |
| 5. | Polydextrose 90% | 118–125° C. | 3600 RPM | Flakes |

Figure 4:
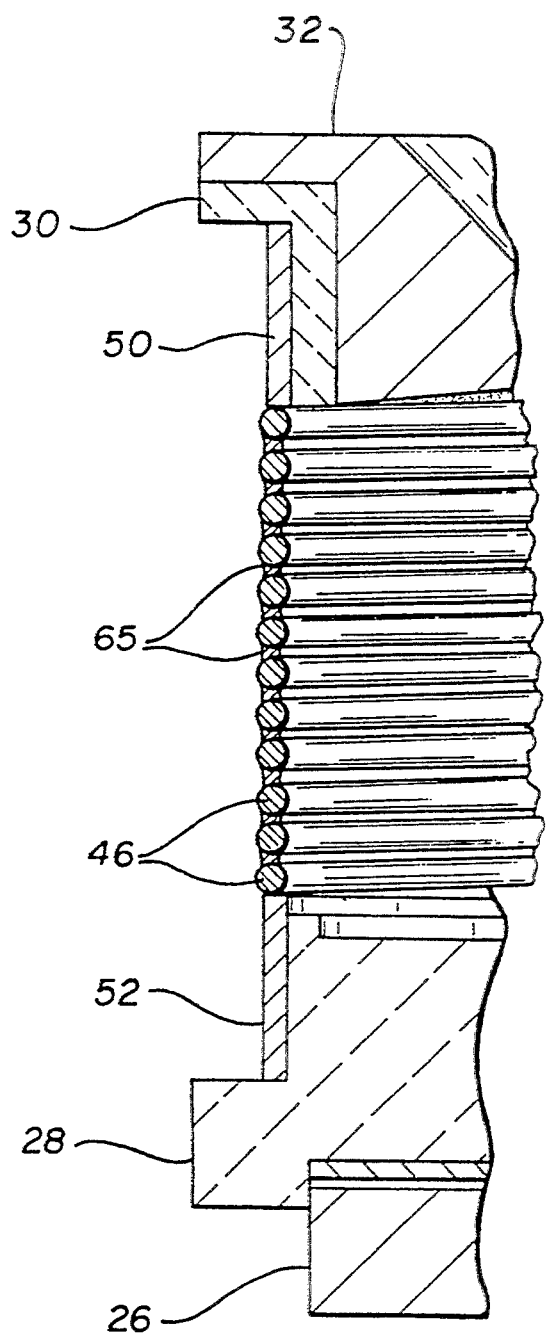
FIG. 4 is an enlarged, partially sectional view of a portion of a spinner head according to a second embodiment of the invention.

An alternative, less preferred embodiment of the invention is shown in FIG. 4. The turns of the cable 46 are brazed to each other at selected points in order to hold the heating element in position as the brazing 65 is applied. A series of brazed, comb-like structures are thereby provided. The spacers are removed once the brazing operation is completed.

Figure 5:
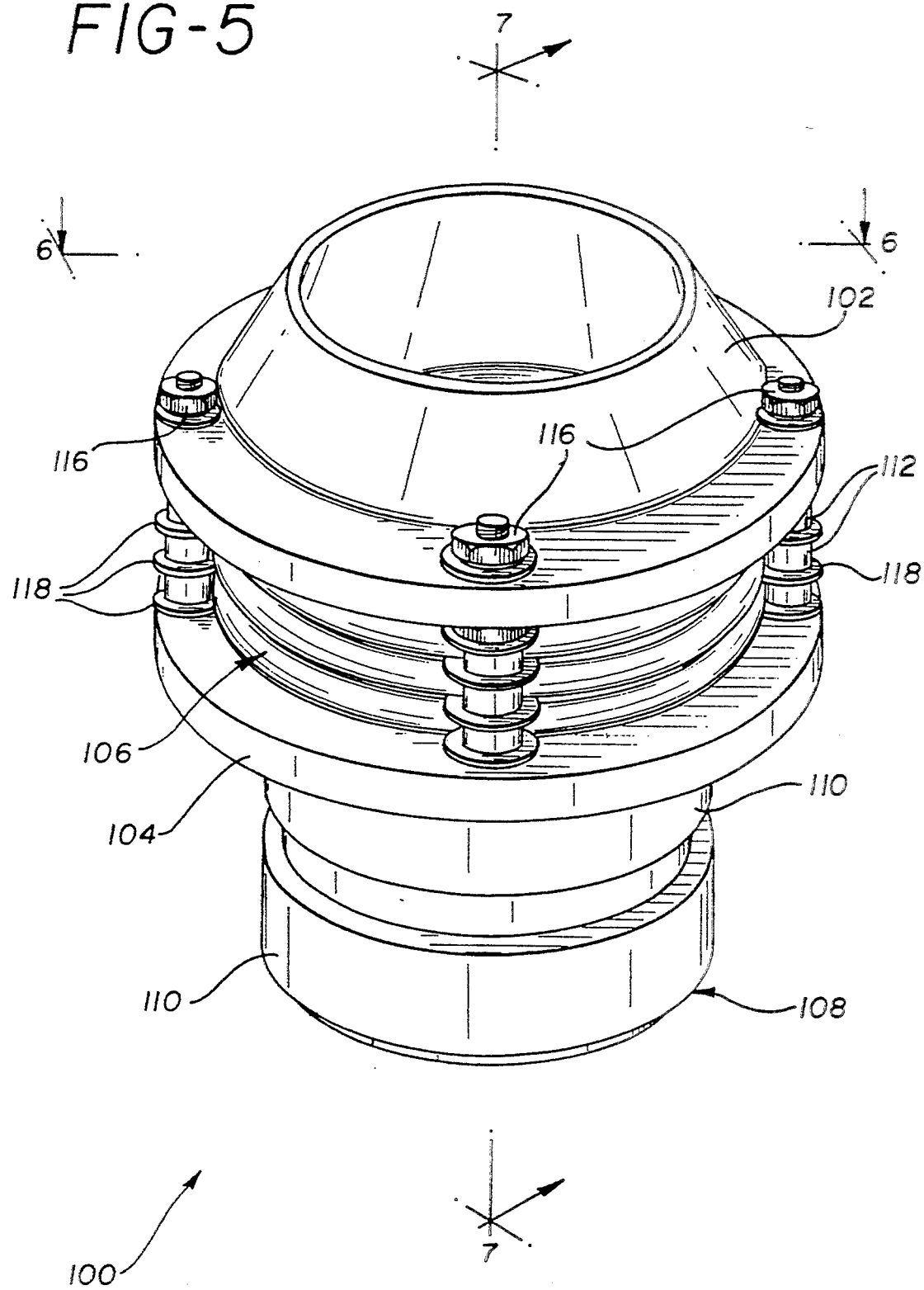
FIG. 5 is a top perspective view of a spinner head according to a third embodiment of the invention.
Figure 6:
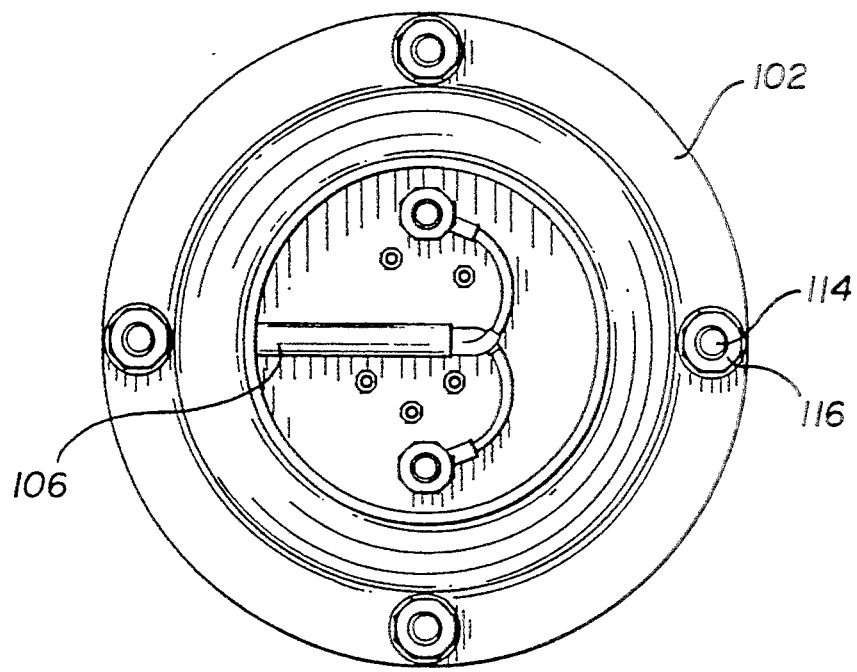
FIG. 6 is a top plan view thereof.
Figure 7:
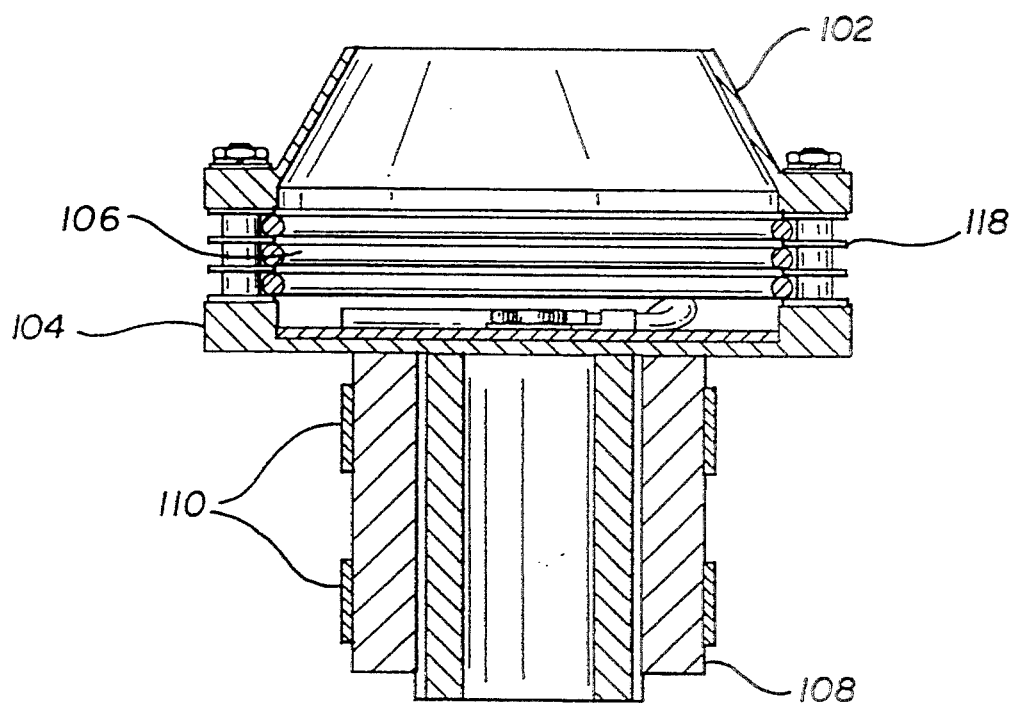
FIG. 7 is a sectional view thereof taken along line 7—7 of FIG. 5.

FIGS. 5–7 show a spinner head 100 according to a third embodiment of the invention. The spinner head includes a cap 102, a base 104 and a cable heating element 106 positioned between the cap and base. Insulating members (not shown) may be provided for separating the heating element 106 from the cap and base. A stem 108 extends from the base, and a pair of slip rings 110 are secured to the stem. The spinner head 100 is driven in the same manner as the spinner head 24 described above so that finished product is collected in the basin 16. The heating element 106 is also substantially the same as that described above. Spacing assemblies including cylindrical sleeves 112 made from ceramic materials extend between the cap 102 and base 104 of the spinner head. The sleeves are positioned in adjoining relation to the heating element 106. A threaded shaft 114 extends through each of the sleeves 112 and openings in annular flange portions of the cap 102 and into threaded base 104, respectively. Nuts 116 are secured to the shafts 114 above and below these annular flange portions.

The gap between each turn of the heating element is controlled by spacing elements in the form of parallel sets of washers 118 which extend between the turns. Each washer 118 is supported by one of the sleeves 112. More than one washer may extend between each turn of the heating element if a larger gap is desired. The turnings of heating element 106 retain its helical configuration, which is depicted in FIG. 7. Like the embodiments of the invention described above, one substantially continuous, helical opening of uniform height is defined by the heating element. The only breaks in continuity result from the spacers and washers. The gap between turns of the heating element are sufficiently small that the solid, thermo-flow material introduced into the spinner head chamber cannot be expelled directly into the basin without first undergoing flash flow as it passes through the heating element.

The embodiment of the invention shown in FIGS. 5–7 allows for easy adjustment of the gap defined between turns of the heating element. In order to increase the gap by a distance corresponding to the thickness of one additional washer, the cap 102 and sleeves 112 are removed. An additional washer is positioned between each turn of the heating element. The sleeves are then reinserted through the base flange and the spacer washers. The cap is repositioned and the nuts 116 tightened in order to complete the operation. This embodiment of the invention is accordingly preferred where versatility of the spinner head is important.

Figure 8:
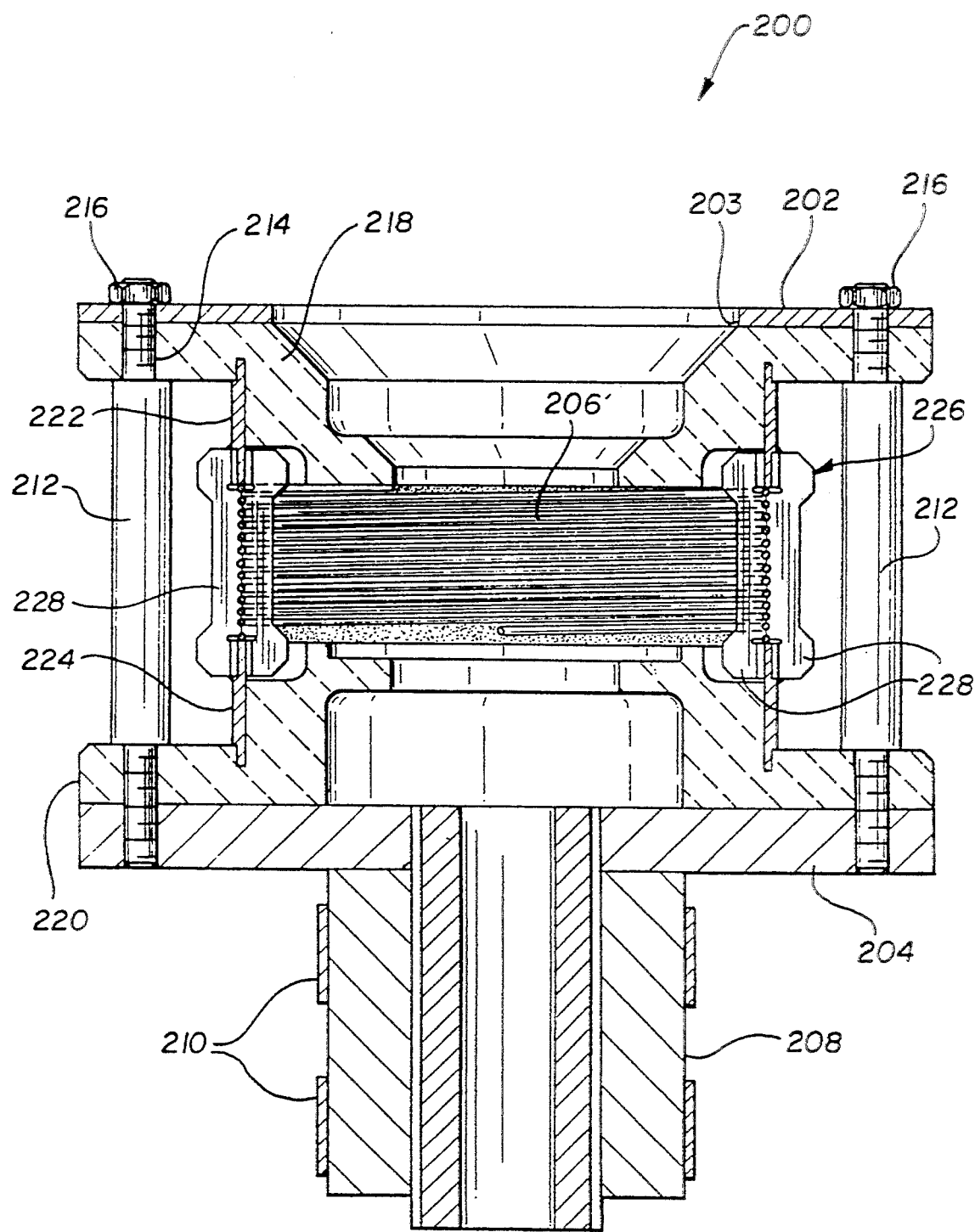
FIG. 8 is a sectional view showing a spinner head according to a fourth embodiment of the invention.

FIG. 8 shows a fourth embodiment of the invention which also allows adjustment of the opening(s) through which material is projected from the spinner head. The spinner head 200 includes a stainless steel cap 202 having an opening 203, a stainless steel base 204, and a cable heating element 206 positioned between the cap and base. A stem 208 extends from the base, and a pair of slip rings 210 are secured to the stem, as schematically shown in the figure. The spinner head 200 is driven in the same manner as the spinner head 24 described above. Cylindrical spacers in the form of sleeves 212 made from ceramic materials extend between the cap 202 and base 204. A threaded shaft 214 extends through each of the sleeves and openings in annular flange portions of the cap and into a threaded base, respectively. Nuts 216 are secured to the shafts 214 above the annular flange portions.

An upper insulating ring 218 made from a ceramic material or other suitable insulator is positioned between the cap 202 and heating element 206. A lower insulating ring 220 is positioned between the base 204 and the heating element. Upper and lower stainless steel rings 222, 224 are secured to the upper and lower insulating rings, respectively. The electronic interface assembly for powering the heating element 206 is omitted from the drawing for purposes of clarity.

Spacer assemblies 226 are secured to the steel rings 222, 224 for providing a uniform gap between turns of the cable heating element 206. Each assembly 226 includes a pair of comb-like elements 228 mounted in opposing relation to each other. Each element includes a plurality of semicircular notches which correspond in diameter to that of the cable which forms the heating element. The elements 228 are spot welded to the upper and lower rings 222, 224 such that one of each pair of elements is within the heating element and the other is just outside of it. The notches within each element are in adjoining relation such that the turns of the cable heating element pass therethrough. The cable heating element preferably is not secured to the comb-like elements 228, but only held in position by them. Sufficient space is provided between each notch within the elements that a uniform gap between about 0.005 and 0.050 inches is provided between turns of the heating element 206. Operation of the spinner head is substantially the same as those described above.

Figure 9:
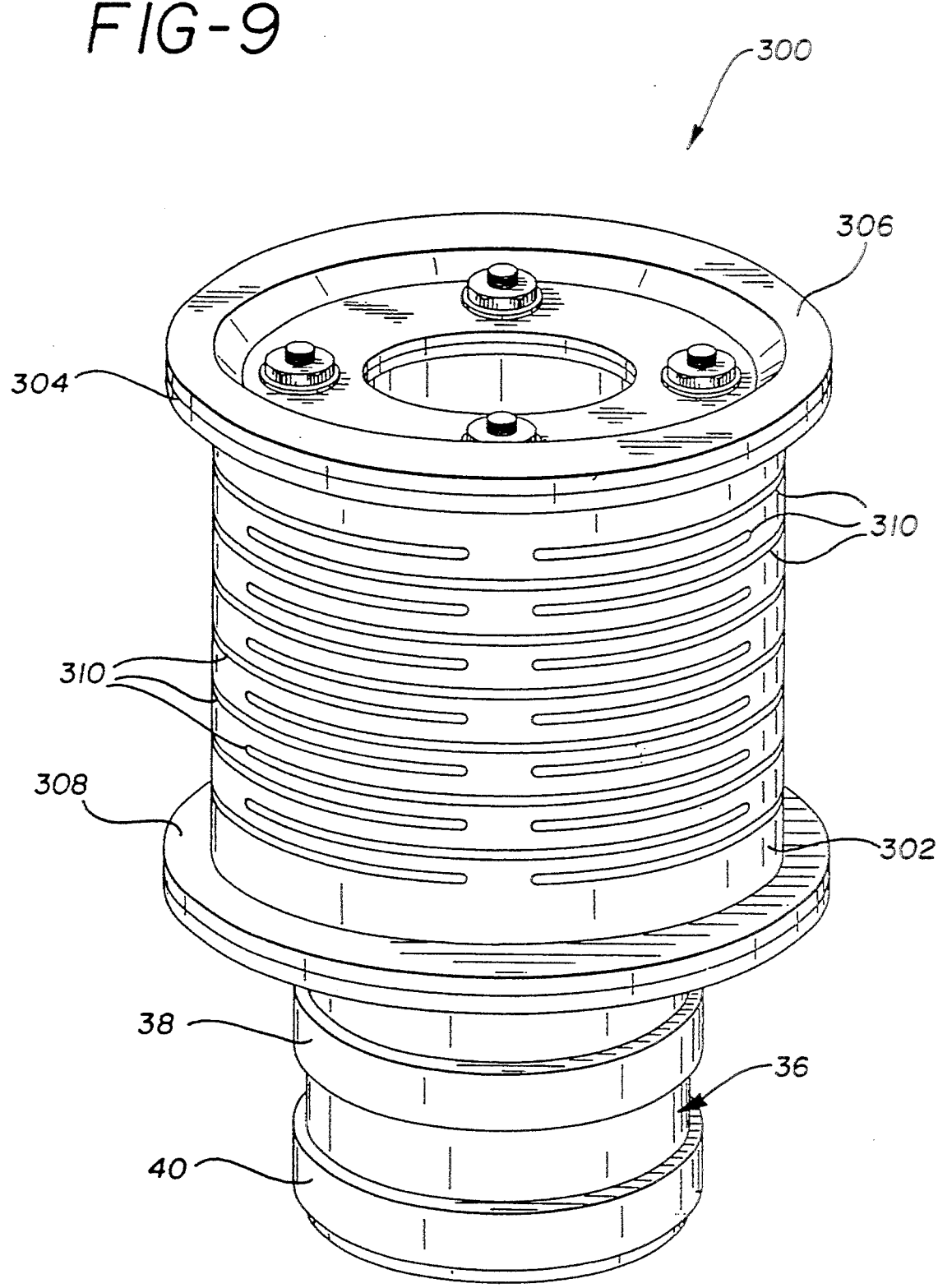
FIG. 9 is a top perspective view of a spinner head according to a fifth embodiment of the invention.

Referring now to FIG. 9, a spinner head 300 according to an alternative embodiment of the invention is shown. The head has a cylindrical shell 302 which includes a plurality of narrow, elongate openings 310 extending through the shell 302. The heights of the openings are preferably uniform, and in the range of about 0.005–0.050 inches. The lengths of the openings are less critical. If desired, one continuous, helical opening may be provided.

The heating element can be the cylindrical shell 302, itself, made from a material which is conductive, but provides a relatively high resistance between a power source (not shown) and ground. A nickel-chrome alloy may be employed for this purpose. Alternatively, a heating element may be placed in the shell or be embedded within the wall of the shell.

An annular upper wall 304 made from highly conductive material engages the upper rim of the shell, and is held in place by a cap 306. An annular lower wall 308, also made from highly conductive material, engages the lower rim of the shell. Conductive brushes may directly or indirectly engage the upper and lower walls, thereby providing power to the heating element.

The spinner head 300 operates in substantially the same manner as those described above, only the material passes through openings 310 in a shell rather than openings between turns of a cable heating element.

While various preferred embodiments of the invention have been shown and described herein, it will be appreciated by those skilled in the art that various approaches may be taken for providing a heating element which defines one or more narrow elongate openings extending at least partially about the axis of rotation of a spinner head. The use of a cable heating element is considered a preferred approach for providing such openings. The cable need not necessarily have a smooth surface as shown, but may include ridges parallel to the direction of flow. Such ridges may affect the shape of certain products projected by the spinner head. The materials from which spinner heads are constructed are well known to the art. The specific materials identified in the disclosure may be replaced by other known materials without materially affecting the operation of the spinner head according to the invention. The invention accordingly is not limited to the precise embodiments disclosed, and various other changes and modifications may be effected therein by one skilled in the art without departing from the scope or spirit of the invention.

What is claimed is:

1. A spinning machine comprising:
a spinner head including a chamber and a heating element defining a wall of said chamber, and
means for rotating said spinner head about an axis,
said heating element comprising a helical cable with a plurality of turns extending about said axis and a plurality of discrete separation members to retain said turns in substantially uniform spatial relation, said turns having space therebetween, said cable and said members together defining a plurality of substantially unimpeded elongate openings in said space between said turns of said cable, said elongate openings extending at least partially about said axis, said elongate openings having a height of between about 0.005 to 0.050 inches and defining a substantially non-tortuous path through which material is projected from said chamber when said spinner head is rotated, said heating element being positioned such that upon rotation of said spinnershead, material within said chamber is propelled directly against said heating element, undergoes flash flow as it passes through said elongate openings, and is projected directly from said elongate openings, said spinning machine being substantially free of structural impediments inside or outside said chamber which would interfere with material being propelled against said heating element or projected from said elongate openings.

2. A spinning machine as described in claim 1, wherein said elongate openings have a substantially uniform height.

3. A spinning machine as described in claim 2, wherein said discrete separation members include a pair of opposing comb-like elements, each of said elements including a plurality of notches receiving a portion of said cable, one of said comb-like elements being positioned within said heating element, the other of said elements being positioned outside of said heating element.

4. A spinning machine as described in claim 3, wherein said spinner head includes a base portion, a cap portion, said heating element being positioned between said base and cap portions, an upper wall portion extending between said cap portion and said heating element, a lower wall portion extending between said base portion and said heating element, said comb-like elements being secured to said upper and lower wall portions.

5. A spinning machine as described in claim 1, wherein said discrete separation members include means for adjusting the height of said openings.

6. A spinning machine as described in claim 5, wherein said spinner head includes a base portion, a cap portion, and wherein said means for adjusting include a plurality of spacer assemblies extending between said base and cap portions and a plurality of spacing elements mounted to said spacer assemblies and extending between the turns of said cable.

7. A spinning machine as described in claim 1, including a basin, said spinner head being positioned within said basin such that upon rotation of said spinner head, material within said chamber is projected directly from said elongate openings into said basin.

8. A spinning machine as described in claim 1, wherein said elongate openings have a height between about 0.005 and 0.010 inches.

9. A spinner head comprising:
a base portion;
a cap portion;
a heating element mounted between said base and cap portions, said heating element comprising a helical cable with a plurality of turns extending about an axis of rotation thereof and a plurality of discrete separation members to retain said turns in substantially uniform spatial relation, said turns having space therebetween, said cable and said members together defining a plurality of substantially unimpeded elongate openings in said space between said turns of said cable, said elongate openings extending at least partially about said axis and defining a substantially non-tortuous path;

a chamber defined by said base portion and said heating element;

an opening defined within said cap portion for introducing material into said chamber;

said heating element being positioned such that said elongate openings are substantially free of structural impediments inside or outside said chamber, whereby material within said chamber is propelled directly against said heating element upon rotation thereof, undergoes substantially complete flash flow as it passes through and is heated within said elongate openings, and is projected freely from said elongate openings..

10. A spinner head as described in claim 9, wherein said elongate openings extend about a substantial portion of said axis.

11. A spinner head as described in claim 10, wherein said elongate openings have a substantially uniform height.

12. A spinner head as described in claim 9, wherein said plurality of discrete separation members include means for adjusting the height of said elongate openings.

13. A spinner head as described in claim 12, wherein said means for adjusting include a plurality of spacer assemblies extending between said base portion and said cap portion, and a plurality of spacing elements removably mounted to said spacer assemblies and extending between the turns of said cable.

14. A spinner head as described in claim 9, wherein said discrete separation members include a pair of opposing comb-like elements extending between said cap portion and said base portion, each of said comb-like elements including a plurality of notches which receive a portion of said cable, one of said comb-like elements being positioned within said chamber, the other of said comb-like elements being positioned outside said chamber.

15. A spinner head as described in claim 9, wherein said elongate openings have a height between about 0.005 and 0.050 inches.

16. A spinner head as described in claim 15, wherein the height of said elongate openings is substantially uniform throughout the length of said elongate openings.

17. A spinner head as described in claim 9, wherein said elongate openings have a height between about 0.005 and 0.010 inches.

18. A spinner head as described in claim 17, wherein the height of said elongate openings is substantially uniform throughout the length of said elongate openings.

19. A method of transforming the physical structure of a material, comprising:

providing a spinner head including a chamber and a heating element defining a wall of said chamber, said heating element comprising a helical cable with a plurality of turns extending about an axis of rotation thereof and a plurality of discrete separation members to retain said turns in substantially uniform spatial relation., said turns having space therebetween, said cable and said members together defining a plurality of substantially unimpeded elongate openings in said space between said turns of said cable, said openings providing a substantially non-tortuous path from inside said chamber to the exterior of said chamber, said openings extending at least partially about said axis of rotation of said spinner head;

introducing a thermo-flow material into said chamber;

heating said heating element;

causing said spinner head to rotate about said axis such that substantially all of said material is propelled directly against said heating element, passes through said opening while undergoing flash flow, and is projected directly from said opening without substantial interference from structural impediments inside or outside of said chamber, whereupon said material reforms into a solid, and collecting the material projected from said elongate openings.

20. A method as described in claim 19, wherein said material introduced into said chamber includes corn syrup solids, including the steps of rotating said spinner head at a selected speed and maintaining said heating element at a selected temperature such that the material projected from said opening is in the form of sheet-like flakes.

21. A method as described in claim 19, wherein said plurality of elongate openings are maintained at a height between 0.005 and 0.050 inches.

22. A method as described in claim 19, wherein the height of said elongate openings is substantially uniform, whereby said material projected from said openings reforms into discrete, solid pieces having generally uniform physical characteristics.

23. A spinning machine comprising:

a spinner head including a chamber and a substantially unitary and rigid cylindrical shell heating element body defining a wall of said chamber;

means for heating said heating element body; and means for rotating said spinner head about an axis, said heating element body defining an elongate opening extending at least partially about said axis, said elongate opening having a height of between about 0.005 to 0.050 inches and defining a substantially non-tortuous path through which material is projected from said chamber when said spinner head is rotated.

24. A spinning machine as described in claim 23, wherein said cylindrical shell heating element body is formed of an electrically conductive resistance heating material, and wherein said means for heating said body comprise means to pass an electric current directly therethrough.

25. A spinning machine as described in claim 23, wherein said means for heating said cylindrical shell heating element body include separate heating elements embedded therein.

26. A spinner head comprising:

a base portion;

a cap portion;

a substantially unitary and rigid cylindrical shell heating element body mounted between said base and cap portions, said heating element body including an elongate opening extending at least partially about the axis thereof and defining a substantially non-tortuous path;

a chamber defined by said base portion and said heating element body;

means for heating said heating element body; and an opening defined within said cap portion for introducing material into said chamber;

said heating element body being positioned such that said opening is substantially free of structural impediments inside or outside said chamber, whereby material within said chamber is propelled directly against said heating element body upon rotation thereof, undergoes substantially complete flash flow as it passes through and is heated within said opening, and is projected freely from said opening.

27. A spinner head as described in claim 26, wherein said cylindrical shell heating element body is formed of an electrically conductive resistance heating material, and wherein said means for heating said body comprise means to pass an electric current directly therethrough.

28. A spinner head as described in claim 26, wherein said means for heating said cylindrical shell heating element body include separate heating elements embedded therein.

29. A method of transforming the physical structure of a material, comprising: providing a spinner head including a chamber, a substantially unitary and rigid cylindrical shell heating element body defining a wall of said chamber, and means for heating said heating element body, said heating element body defining an elongate opening which provides a substantially non-tortuous path from inside said chamber to the exterior of said chamber, said opening extending at least partially about an axis of rotation of said spinner head;

introducing a thermo-flow material into said chamber;

heating said heating element body;

causing said spinner head to rotate about said axis such that substantially all of said material is propelled directly against said heating element body, passes through said opening while undergoing flash flow, and is projected from said opening, whereupon said material reforms into a solid, and collecting the material projected from said elongate opening.

30. A method as described in claim 29, wherein in said step of providing said spinner head, said cylindrical shell heating element body is formed of an electrically conductive resistance heating material and said means for heating said body comprise means to pass an electric current directly therethrough.

31. A method as described in claim 29, wherein in said step of providing said spinner head, said means for heating said body include separate heating elements embedded therein.

* * * * *